(12) United States Patent
Schut et al.

(10) Patent No.: US 9,592,555 B2
(45) Date of Patent: Mar. 14, 2017

(54) CONTINUOUS FLOW REACTOR FOR THE SYNTHESIS OF NANOPARTICLES

(71) Applicant: Shoei Electronic Materials, Inc., Corvallis, OR (US)

(72) Inventors: David M. Schut, Philomath, OR (US); Thomas E. Novet, Corvallis, OR (US); George M. Williams, Beaverton, OR (US)

(73) Assignee: Shoei Electronic Materials, Inc., Corvallis, OR (US)

( * ) Notice: Subject to any disclaimer, the term of this patent is extended or adjusted under 35 U.S.C. 154(b) by 60 days.

(21) Appl. No.: 14/214,587

(22) Filed: Mar. 14, 2014

(65) Prior Publication Data
US 2014/0264171 A1 Sep. 18, 2014
US 2016/0375495 A9 Dec. 29, 2016

Related U.S. Application Data

(60) Provisional application No. 61/783,753, filed on Mar. 14, 2013, provisional application No. 61/783,911, (Continued)

(51) Int. Cl.
*B01J 19/12* (2006.01)
*C09K 11/56* (2006.01)
(Continued)

(52) U.S. Cl.
CPC ............ *B22F 9/16* (2013.01); *B22F 1/0018* (2013.01); *B22F 1/0062* (2013.01); *B22F 1/02* (2013.01);
(Continued)

(58) Field of Classification Search
CPC .......... B82Y 30/00; B82Y 10/00; B82Y 5/00; B82Y 15/00; B82Y 20/00; C09K 11/02;
(Continued)

(56) References Cited

U.S. PATENT DOCUMENTS 6,179,912 B1 1/2001 Barbera-Guillem et al.
6,322,901 B1 11/2001 Bawendi et al.
(Continued)

FOREIGN PATENT DOCUMENTS

CN 101589181 A 11/2009
JP 2006188666 A 7/2006
(Continued)

OTHER PUBLICATIONS

Bilecka et al., "Microwave chemistry for inorganic nanomaterials synthesis", Aug. 2010, Nanoscale, vol. 2, No. 8, pp. 1358-1374.*
(Continued)

*Primary Examiner* — Matthew E Hoban
*Assistant Examiner* — Lynne Edmondson
(74) *Attorney, Agent, or Firm* — Alleman Hall McCoy Russell & Tuttle LLP

(57) ABSTRACT

A continuous flow reactor for the efficient synthesis of nanoparticles with a high degree of crystallinity, uniform particle size, and homogenous stoichiometry throughout the crystal is described. Disclosed embodiments include a flow reactor with an energy source for rapid nucleation of the procurors following by a separate heating source for growing the nucleates. Segmented flow may be provided to facilitate mixing and uniform energy absorption of the precursors, and post production quality testing in communication with a control system allow automatic real-time adjustment of the production parameters. The nucleation energy source can be monomodal, multimodal, or multivariable frequency microwave energy and tuned to allow different precursors to nucleate at substantially the same time thereby resulting in a substantially homogenous nanoparticle. A shell application system may also be provided to allow one or more shell layers to be formed onto each nanoparticle.

34 Claims, 11 Drawing Sheets

Related U.S. Application Data filed on Mar. 14, 2013, provisional application No. 61/784,107, filed on Mar. 14, 2013, provisional application No. 61/784,257, filed on Mar. 14, 2013, provisional application No. 61/784,306, filed on Mar. 14, 2013, provisional application No. 61/784,358, filed on Mar. 14, 2013, provisional application No. 61/784,183, filed on Mar. 14, 2013, provisional application No. 61/949,969, filed on Mar. 7, 2014.

(51) Int. Cl.
| | |
|---|---|
| C09K 11/88 | (2006.01) |
| B22F 9/16 | (2006.01) |
| C01G 21/21 | (2006.01) |
| B22F 1/00 | (2006.01) |
| B22F 1/02 | (2006.01) |
| B22F 9/24 | (2006.01) |
| C01B 19/00 | (2006.01) |

(52) U.S. Cl.
CPC .............. *B22F 9/24* (2013.01); *C01B 19/002* (2013.01); *C01G 21/21* (2013.01); *B22F 2999/00* (2013.01); *C01P 2004/03* (2013.01)

(58) Field of Classification Search
CPC ..... C09K 11/883; C09K 11/565; C09K 11/62; C09K 11/89; B01J 19/12; B01J 19/126; B01J 2219/00984; C01P 2004/64; C01P 2004/84; B22F 1/0018; B22F 9/16
USPC ......... 423/299, 409, 508, 509, 561.1, 566.1; 252/301.4 R, 301.4 S; 422/186; 427/553; 204/157.43

See application file for complete search history.

(56) References Cited

U.S. PATENT DOCUMENTS

| | | |
|---|---|---|
| 6,458,335 B1 | 10/2002 | Lemaitre et al. |
| 6,833,019 B1 | 12/2004 | Lewis, III et al. |
| 8,101,021 B2 | 1/2012 | Yen et al. |
| 8,420,155 B2 | 4/2013 | Nie et al. |
| 2005/0142059 A1* | 6/2005 | Kim ....................... B01J 19/126 423/608 |
| 2006/0074605 A1* | 4/2006 | Williams ................ H03M 7/30 702/189 |
| 2007/0274893 A1* | 11/2007 | Wright .............. H01J 37/32192 423/449.1 |
| 2008/0296144 A1* | 12/2008 | Strouse .................. B82Y 30/00 204/157.43 |
| 2009/0056628 A1* | 3/2009 | Kortshagen ............ B82Y 30/00 118/718 |
| 2009/0295005 A1* | 12/2009 | Rauscher ............... B82Y 30/00 264/5 |
| 2009/0321692 A1* | 12/2009 | LoCascio ............... C09K 11/02 252/518.1 |
| 2010/0092367 A1* | 4/2010 | Porterat ................. B82Y 30/00 423/417 |
| 2011/0229397 A1* | 9/2011 | Bartel .................... B01J 19/243 423/299 |
| 2012/0001356 A1 | 1/2012 | Chang et al. |
| 2012/0315391 A1 | 12/2012 | Char et al. |
| 2015/0182936 A1* | 7/2015 | Kim ....................... B01J 19/126 423/509 |

FOREIGN PATENT DOCUMENTS

| | | |
|---|---|---|
| TW | 200839042 A | 10/2008 |
| TW | 201105585 A | 2/2011 |

OTHER PUBLICATIONS

International Bureau of WIPO, International Preliminary Report on Patentability Issued in Application No. PCT/US2014/029837, Oct. 21, 2014, WIPO, 11 pages.
USA United States Patent and Trademark Office, International Search Report Issued in Application No. PCT/US2014/029837, Oct. 21, 2014, WIPO, 3 pages.
Taiwan Intellectual Property Office, Office Action and Search Report Issued in Application No. 104108205, Jun. 27, 2016, 17 pages. (Submitted with Translation of Search Report).
State Intellectual Property Office of the People's Republic of China, First Office Action Issued in Patent Application No. 201480014725.4, Sep. 20, 2016, 44 pages.

* cited by examiner

CONTINUOUS FLOW REACTOR FOR THE SYNTHESIS OF NANOPARTICLES

PRIORITY CLAIM

This application claims priority to U.S. provisional patent application Ser. No. 61/783,753; 61/783,911; 61/784,107; 61/784,257; 61/784,306; 61/784,358; and 61/784,183 filed on Mar. 14, 2013, and further this application claims priority to U.S. provisional application Ser. No. 61/949,969 filed Mar. 7, 2014; all of the disclosures of which are hereby incorporated by reference.

FIELD

The present disclosure relates to a system and method for efficient and continuous production of uniformly-sized nanoparticles which include metal nanoparticles and nanocrystalline quantum dots.

BACKGROUND

This section provides background information related to the present disclosure which is not necessarily prior art.

Nanoparticles, which can be classified as nanocrystalline materials, nanocrystallites, nanocrystals, quantum dots, and quantum dot materials are produced and used for a wide variety of applications. For example, semiconductor nanocrystallites emit a visible light over a narrow range of wavelengths and are used in the fabrication of light emitting diodes and the like.

Basic steps, materials, and processes for producing nanocrystalline quantum dot materials are described in U.S. Pat. Nos. 6,179,912; 6,322,901; 6,833,019 8,101,021, and 8,420,155; U.S. patent application publication No. US2012-0315391, and Japanese patent application publication No. 2006-188666, the disclosures of which are hereby incorporated by reference. These and other known production and synthesis systems and methods for producing nanoparticles give rise to several problems, including, but not limited to, inefficient production, poor particle quality, inconsistent particles sizes, and/or excessive waste of the raw materials used to form the particles.

SUMMARY

This invention relates to the system and chemistries needed for the production of nanoparticles. This invention also relates to systems and chemistries suitable for production of nanocrystalline quantum dots of a uniform and repeatable size and size distribution on a large scale that is both economical and efficient. Furthermore, this invention relates to the chemistries and processes needed to place between one or more shells over the core nanocrystalline quantum dots—to enhance the electronic and/or optical properties of the nanocrystalline quantum dots and also to improve durability of these materials.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. According to this disclosed embodiment, the process is described in detail for synthesizing nanoparticles such as quantum dots, among others.

A continuous flow cell reactor production system for the production of quantum dots and its related components are shown in FIGS. 1-10, 11B and 12B.

Process Overview

Figure 1:
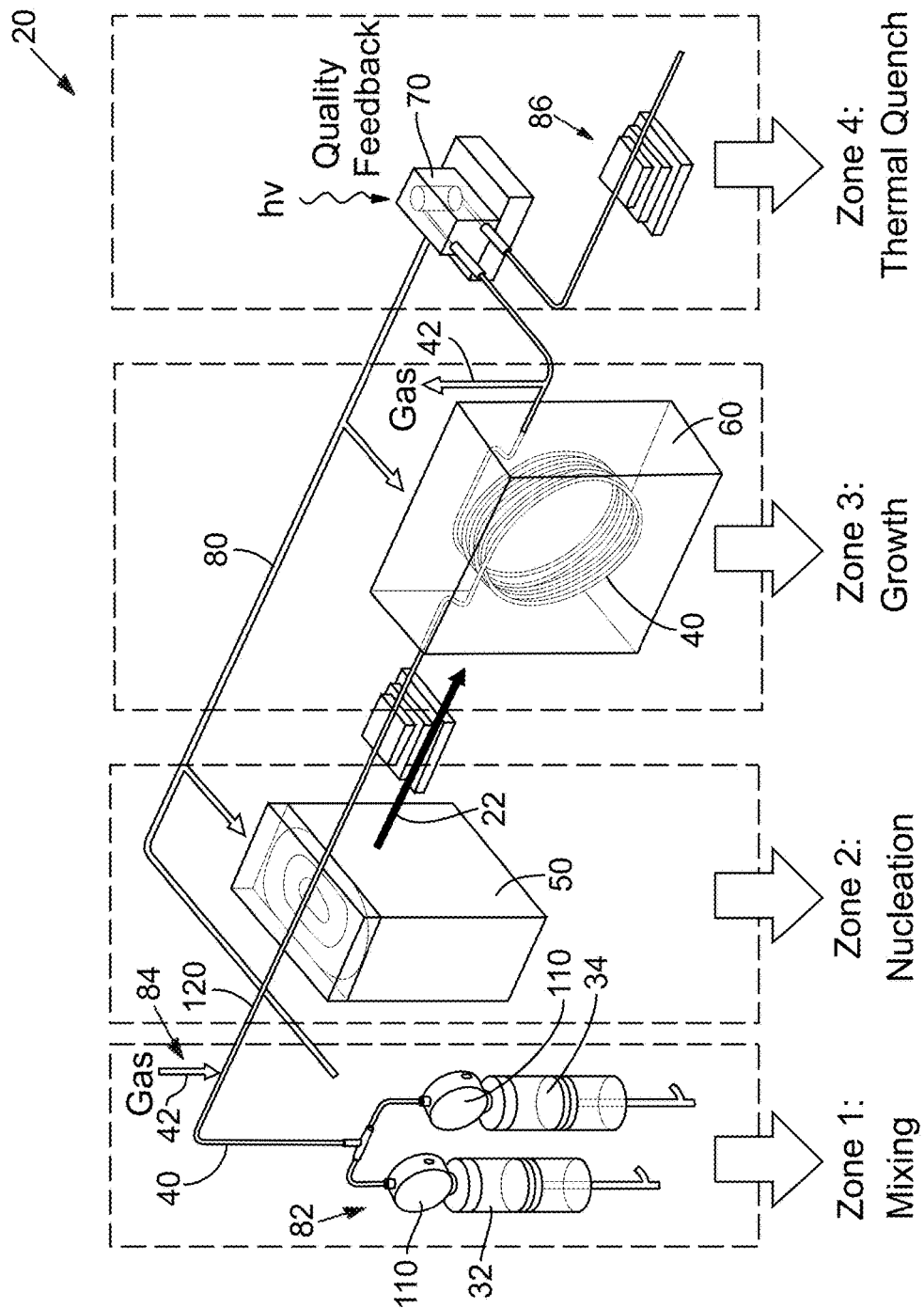
FIG. 1 is an isometric schematic view of a four zone continuous flow cell reactor for the production of nanoparticles in accordance with a preferred embodiment of the present invention.
Figure 2:
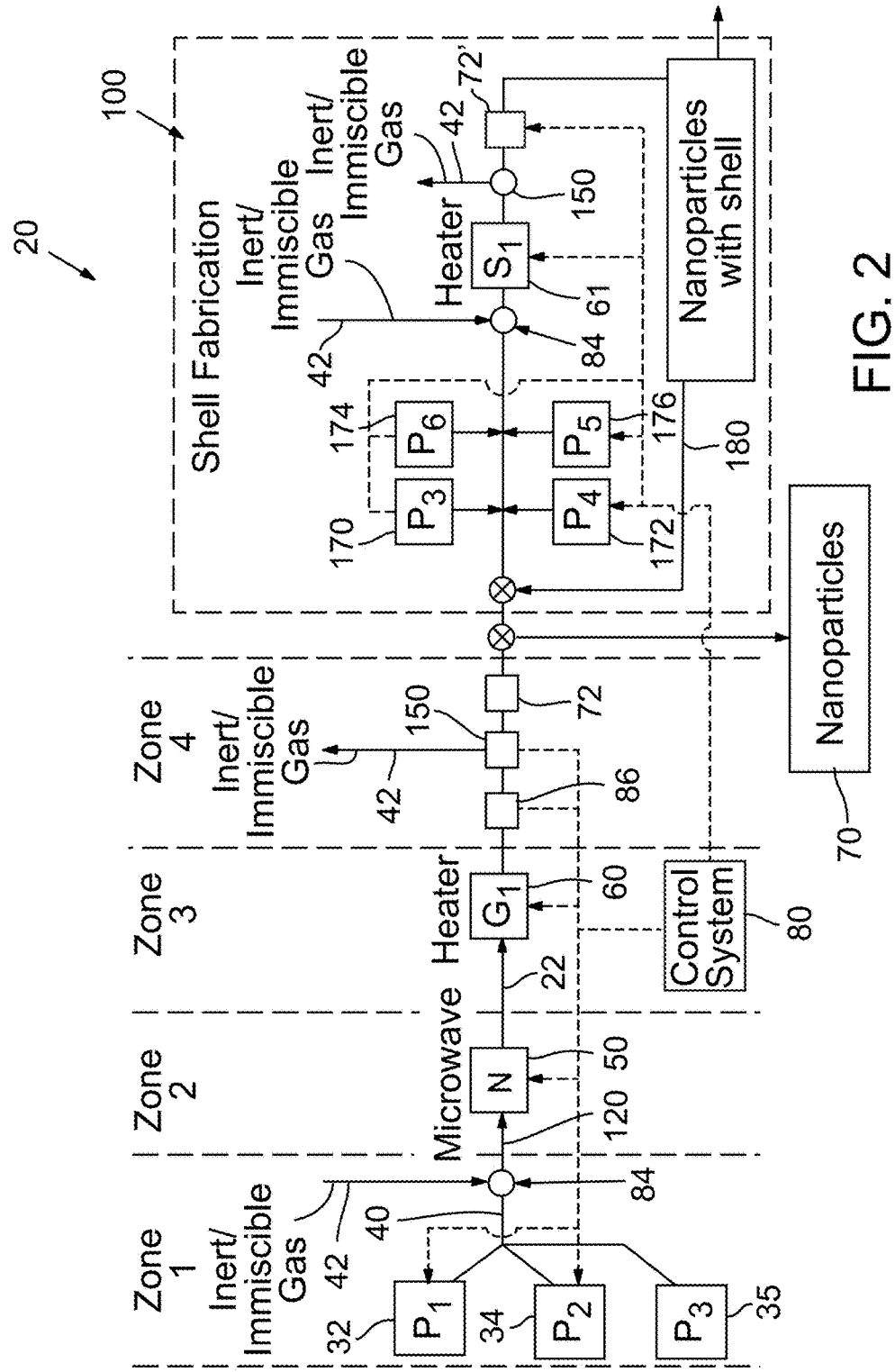
FIG. 2 is a schematic view of a four zone continuous flow cell reactor of FIG. 1 showing an optional shell fabricator for fabricating shell layers on the nanoparticles.

A conceptual diagram of the nanoparticle production system 20 is shown schematically in FIGS. 1 & 2 and provides a specific example of the system. The system 20 includes a continuous flow path 22 that passes through at least four zones (1-4, respectively). In zone 1, two or more precursors 32, 34 are metered and mixed together and passed through a tube 40 where a reactively inert gas 42 such as nitrogen, argon, and the like may be inserted therein to provide segmented flow of the mixture as it passes to the next zone. For example, in one disclosed embodiment the two precursors 32, 34 can be a reducing agent and one or more cationic precursor(s). Alternatively, the two precursors 32, 34 can be one or more anionic precursor(s) and one or more cationic precursor(s).

In zone 2, the precursor mixture is rapidly energized by an energy source 50, preferably by use of a microwave oven selected from monomodal, multimodal or multivariable frequency where the precursors 32, 34 are rapidly and uniformly nucleated. The flow of the nucleated precursors then passes through to zone 3 where a heat source 60 allows the nucleated precursors to enter a growth phase. The process is quenched in zone 4, and the resulting nanoparticles 70 are separated from the reactively inert gas 42.

A nanoparticle quality testing system 72 may be provided following the quenching that tests the quality of the nanoparticles 70 being continuously produced by the system 20. The quality testing system 72 can be in communication with a control system 80 that is also operably connected to the precursor deliver system 82, reactively inert gas delivery system 84, energy source 50 in zone 2, heat source 60 in zone 3 and the quenching system 86 to modulate the volume of precursors 32, 34, gas injection, time, temperature, energy level and flow rate through the energy source 50 and heat source 60 as needed to automatically optimize nanoparticle quality in real-time based on the detected quality of the particles being produced.

As shown in FIG. 2, a shell fabrication system 100 may be provided after zone 4 to allow one or more shell layers to be formed over each nanoparticle 70.

Figure 8:
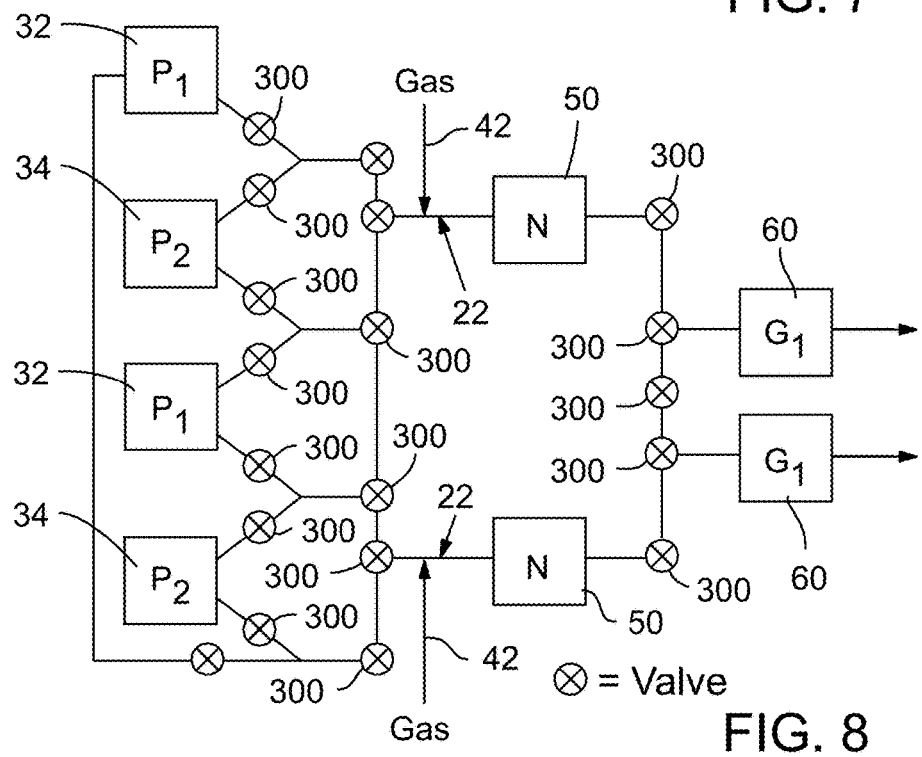
FIG. 8 shows a schematic view of a system layout with valves placed at key locations so as to allow redundancy in the system thereby allowing fabrication to continue if any one component in the system fails.

A plurality of reductant elements of the production line may be provided with the individual precursors and nanoparticle flow paths interconnectable with valves or the like to allow redirection of the flow path through alternative components should one component become inoperable as shown in FIG. 8.

Each of these zones and their preferred related components are discussed in greater detail below.

Zone 1—Precursor Metering and Mixing

In zone 1, at least one precursor 32 and preferably at least two precursors 32, 34 are metered from their respective reservoirs and metered in the proper proportion into the continuous flow path 22 that extends through zones 2-4. The flow path 22 is preferably a tube 40 having an inner diameter between $\frac{1}{16}$ of an inch to 1 inch, and more preferably between $\frac{1}{4}$ of and a $\frac{1}{2}$ inch.

The desired concentration of precursors or a concentration greater than that initially desired, is introduced into the flow path 22 using a metering pump 110 (syringe pump, peristaltic pump, diaphragm pump as examples) to dispense into the flow path the desired quantity of material (precursor). In the case where the concentration is higher than desired for the reaction, a dilution can take place by metering the desired solvent to dissolve the precursor, while in the line, to the desired concentration.

A mixing of the precursors/components for the reaction can take place using a static mixer, such as a T-mixer, to ensure complete mixing of the precursors/components of the reaction. Alternatively, a different type of mixer, such as an active stirrer, can be used such that a homogenous solution is formed after exiting the mixing area of the precursors. The precursors are preferably introduced into a tube 40 that defines a flow path 22 through the system 20 and then mixed with the mixer prior to entering zone 2. Alternatively, the precursors can first be mixed together and then passed to a tube that defines the flow path through zone 2. The sum of the precursor flows establishes the process flow rate. One or more additional precursors 35 (FIG. 2) may also be provided.

Figure 6:
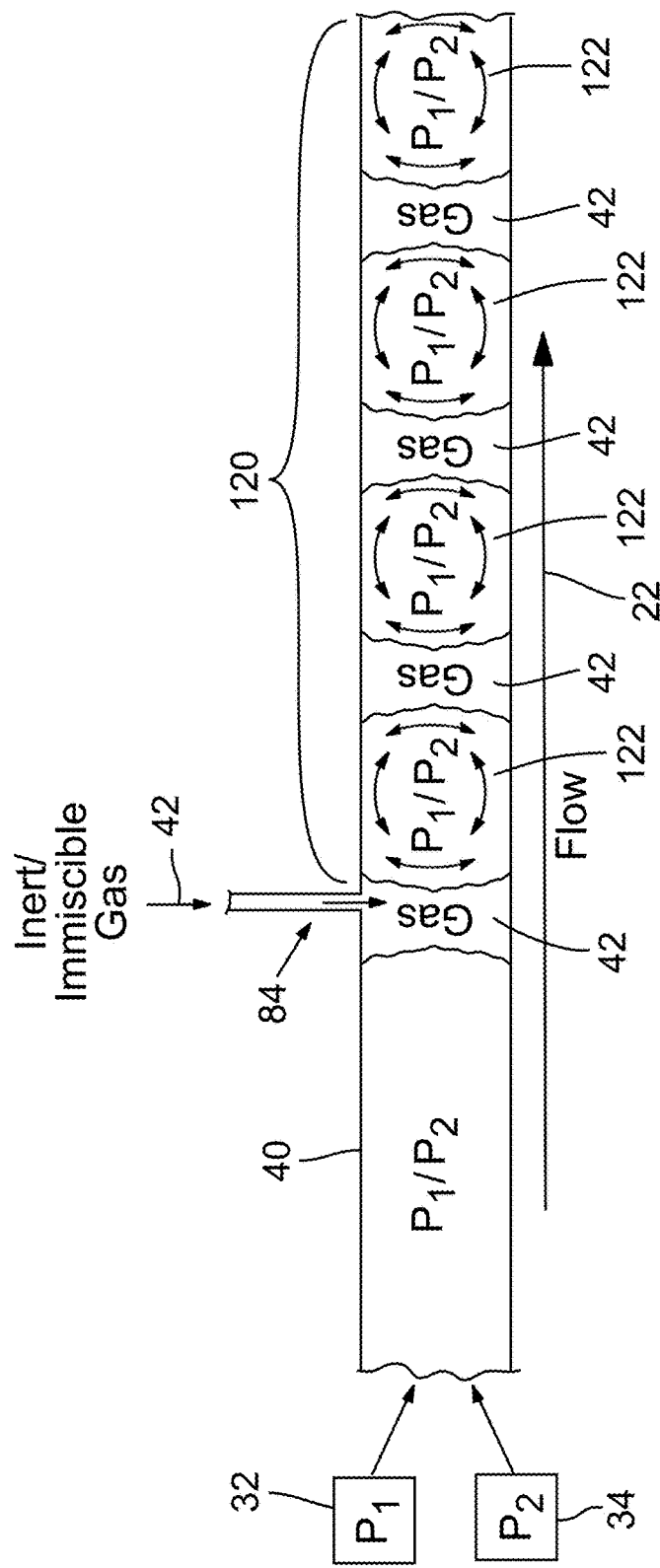
FIG. 6 shows an enlarged cross-sectional view of the continuous flow path in FIG. 1 showing a possible segmented flow of precursors with a reactively inert gas such as nitrogen, argon, and the like segmented therein.

Before advancing to zone 2 in the flow path 22, a plug of reactively inert gas 42, such as nitrogen, argon or the like, that is immiscible with the reactant fluid is introduced to create a segmented flow 120 through the flow path 22 as best shown in FIGS. 1, 2 and 6. The introduction of the segmented flow has two purposes: (1) turbulent mixing (the flow against the wall is slower due to friction than the flow in the middle of the tube, creating turbulence) is introduced within the precursor portion 122 of the flow, and (2) reduction of material deposition on the sidewalls. The latter event occurs through a combination of flow, turbulence and surface tension to eliminate any deposition of material on the sidewalls, which allows for sites of nucleation to occur (an undesirable effect). If desired, mixing of the precursors can be further enhanced by surface roughness on the interior surface of the tube containing the mixture of precursors.

Figure 3:
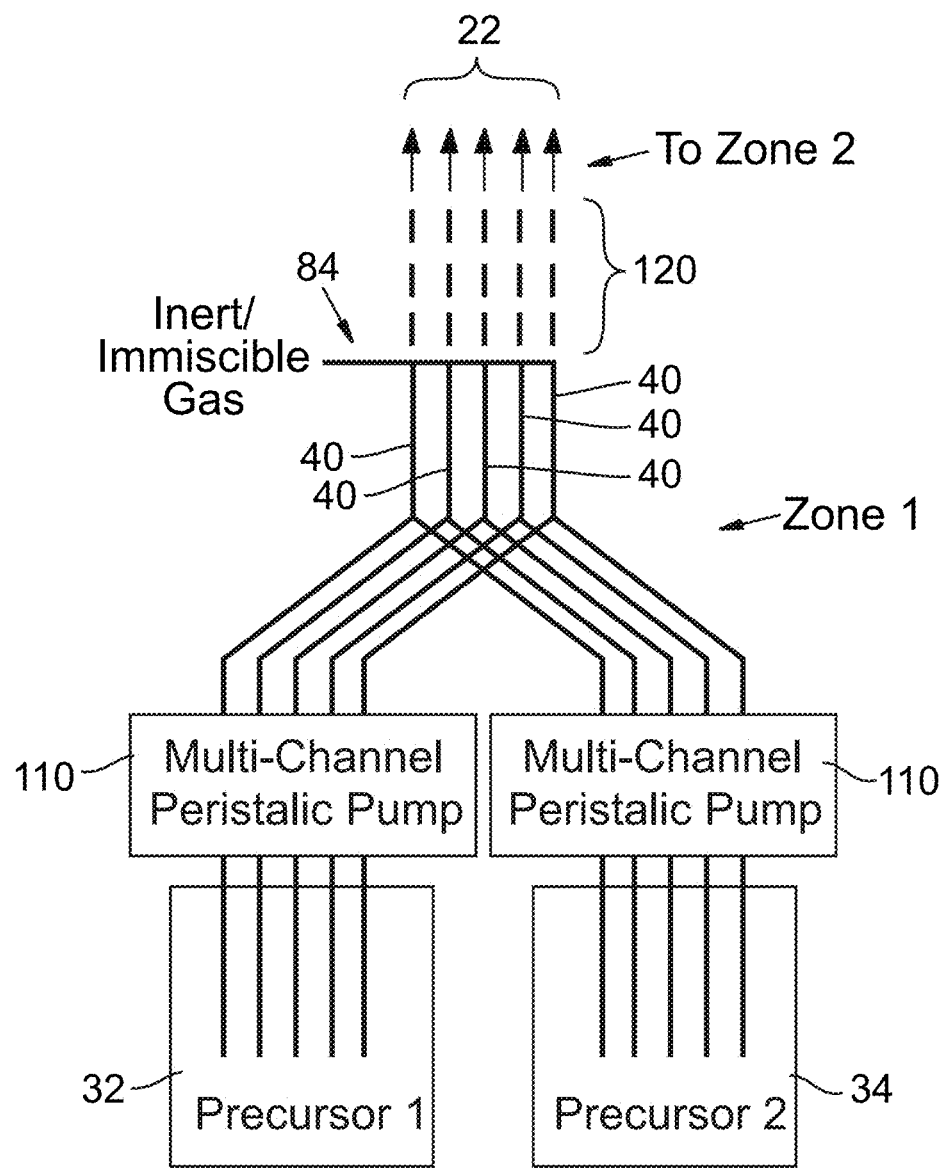
FIG. 3 is a schematic view of zone 1 of the continuous flow reactor of FIG. 1 showing introduction of precursors and a possible segmented flow.

As shown in FIG. 3, a plurality of flow path 22 tubes 40 may be used to increase the rate of production of nanoparticles. Multiple lines are used to introduce two different precursors 32, 34 together, mix them, and then introduce the segmented flow 120 by introducing nitrogen gas, argon gas or the like into the reaction lines.

Zone 2—Nucleation

This zone through the flow path 22 is for the initiation of nucleation. Rapidly increasing the energy level of the precursors 32, 34 with an energy source 50 quickly brings the solution and/or precursors in the flow path tube 40 to the energy level (including temperature) at which precursors will nucleate and undergo kinetic growth within one minute, preferably being equal or less than ten seconds, more preferably within less than 3 seconds and even more preferably within less than 2 seconds.

This energy level increase may be done using several different methods, such as microwave/dielectric heating, sonication, thermal heating by induction or convection, or even breaking of bonds through irradiation with lasers. This is the rapid breakdown of precursors into reactive components forming a nucleate that may be larger than the initial precursors, but much smaller than a nanoparticle or quantum dot of interest. The formation of nucleates is terminated rapidly in order to maintain size control. The duration of the reaction in zone 2 of the flow cell reactor is rapid, being less than one minute, preferably being equal to or less than ten seconds, and more preferably within less than 3 seconds and even more preferably within less than 2 seconds.

The need for rapid temperature equilibration of the flow cell precursor material to a given temperature through application of energy from the energy source is necessary in order to maintain tight control of the resultant nanoparticle size. By having short nucleation periods, which are typically conducted at temperatures greater than the growth temperature, growth upon the resultant nucleates can be conducted without the formation of new nucleates during the growth (Zone 3) stage of the nanoparticle formation. If the nucleation period is extended, nucleates are formed throughout this period. Additionally, because growth may also occur at this step (an undesirable feature at this point and is minimized through the use of short nucleation times), nucleates that form immediately in Zone 2 will be larger than those nucleates that form towards the end of the Zone 2.

Preferably, the energy source 50 uniformly heats or excites all precursors 32, 34 (or increases their energy levels) passing through it. A microwave has proven to be particularly useful at accomplishing uniform heating to nucleate the precursors. The microwave can be implemented in three different fashions, depending on implementation within the flow cell reactor. Monomodal waveforms (where a high Q-factor is obtained through deconstructive/constructive interference effects of a standing wave) are good for producing high intensity (high energy density) microwave peaks that rapidly heat the reaction solution within the flow cell reactor. However, the limit to this technology is that multiple lines cannot be effectively heated using this method. A second method is the use of multi-modal microwaves where a single wavelength of microwave is used (typically 915 MHz, 2.45 GHz, or 5.8 GHz), but no standing wave is created. Instead, a baffle system is used to route the microwaves through multiple angles, allowing uniform energy exposure throughout the flow cell reactor cavity. This allows uniform heating of multiple flow cell tubes through the reactor cavity. The drawback to this method is lower intensity (lower energy density) microwave irradiation within the flow cell reactor cavity. Finally, a multivariable frequency microwave may be used where microwaves of different frequencies (typically between 5.8 GHz and 7.0 GHz) are rapidly cycled in small steps (0.01 to 0.1) to produce uniform heating through the microwave flow cell cavity by creating multiple standing waves of a given frequency.

The flow rate of the precursor thorough the microwave, the concentration of the precursors, the diameter of the tubing containing the precursor mixture, the length of tubing being exposed to microwave energy and the power of the microwave being used are selected to provide the optimal time and energy exposure for nucleation of the mixture.

Moreover, the frequencies of the microwave can be oscillated rapidly on the order of microseconds over a large range. When using an oscillating multimodal or multivariable frequency microwave in a heating cavity, an additive heating effect is produced. While there are many dips and peaks in the wave pattern produced, the physical window for processing becomes much larger than with a monomodal microwave frequency. This allows for additional sample size and latitude for placement of the cell in the flow cell reactor.

Moreover, because each transition in a molecule for rotational, vibrational and bending is frequency dependent, using a multivariable frequency microwave allows for excitation of a plurality of modes of different molecules at once. This increases the heating efficiency of the microwave as many molecules will have very low capture cross-sections at certain frequencies.

Figure 9:
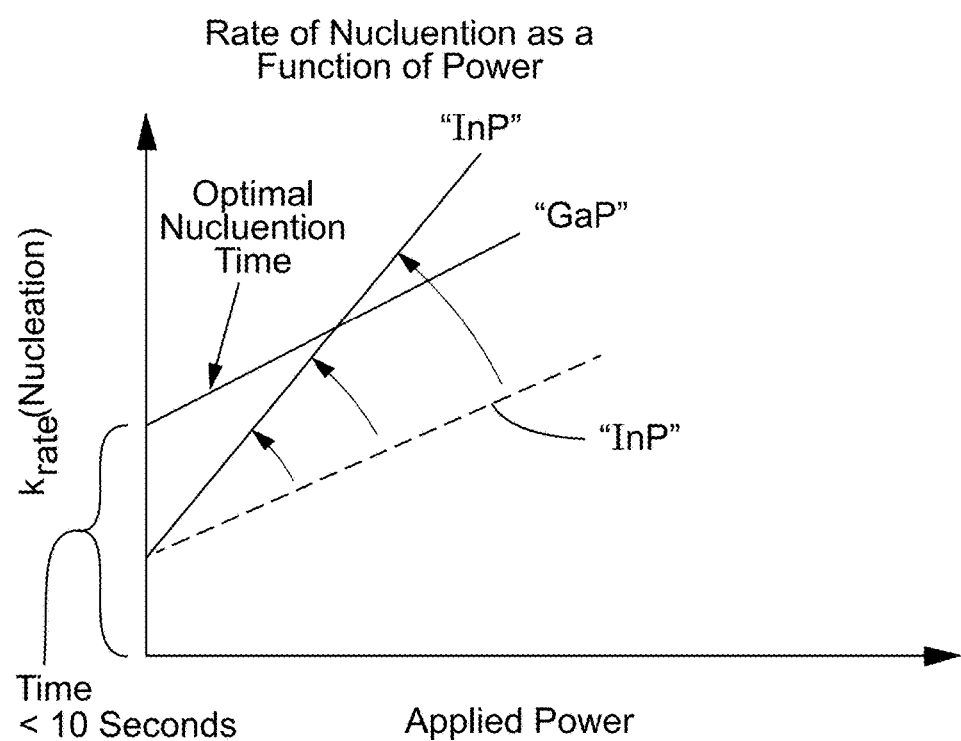
FIG. 9 shows an exemplar reaction chart relating the nucleation time and temperature or energy levels of two different precursors.

In addition, the microwave can be selected or tuned to excite two or more different precursors so that they nucleate at the same time. As shown in FIG. 9, different precursors tend to nucleate at a different time for a substantially constant temperature. By modulating the frequencies and/or the applied power at which the microwave engages the precursors, the nucleating time between two different precursors can be substantially the same. When two different precursors nucleate at the same time the resulting nanoparticle produced is homogenous as shown by the well-defined crystalline structure 400 in FIG. 11B. An actual image of the homogenous structure obtained using Transmission Electron Microscopy (TEM) is shown in FIG. 12B. The modulation of the frequencies and/or applied power allows the nucleation time between different precursors to be tuned and/or optimized so as to allow them to nucleate at substantially the same time.

Figure 11A:
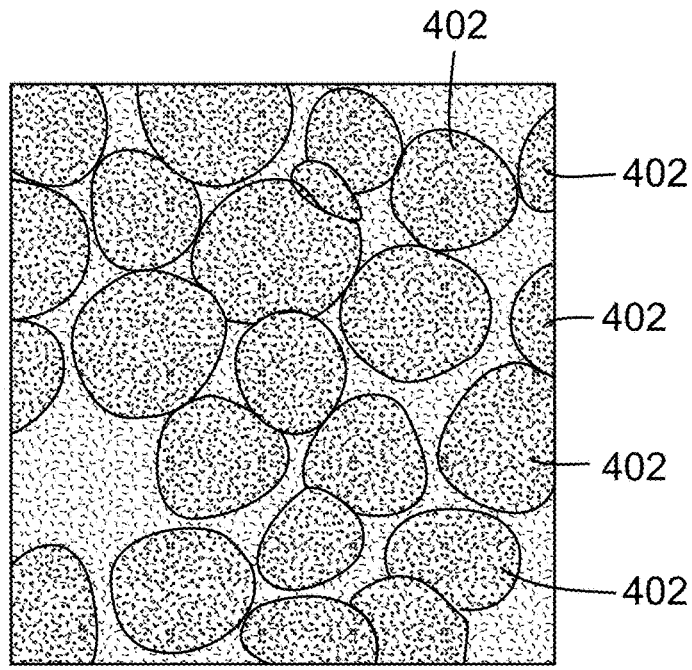
FIG. 11A (PRIOR ART) shows a sketch of a crystalline structure of a non-homogenous nanoparticle formed by different precursors nucleating at different times. $CuInSe_2$ material produced using a thermal batch process resulting in Cu rich cores around which In is later deposited, producing an inhomogeneous nanoparticle of $CuInSe_2$.
Figure 12A:
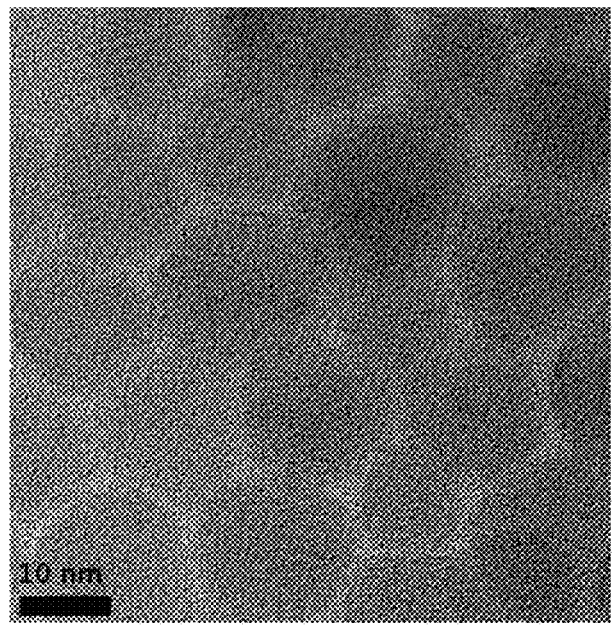
FIG. 12A (PRIOR ART) is an actual image obtained using Transmission Electron Microscopy (TEM) of the crystalline structure of FIG. 11A.

In contrast, if traditional constant heating methods are used to nucleate the precursors, they will not consistently nucleate at the same time as shown in broken lines for exemplar precursor InP in FIG. 9 resulting in an irregularly-defined crystalline structure 402 as shown in FIG. 11A (PRIOR ART). An actual image of the irregularly-defined structure obtained using TEM is shown in FIG. 12A (PRIOR ART).

As an example, $CuInSe_2$, when produced by batch processes or non-microwave initiated processes, produces material which is inhomogeneous in nature (Cu rich or In rich regions within a batch of materials or in a nanoparticle itself), such as shown in FIGS. 11A (PRIOR ART) and 12A (PRIOR ART). When the microwave conditions are set appropriately, because In has a larger d-orbital system than Cu—and hence, more polarizable—it absorbs energy faster than Cu does, increasing the rate of its reactivity, enabling the resulting reaction to produce homogeneous materials such as shown in FIGS. 11B and 12B.

Figure 11B:
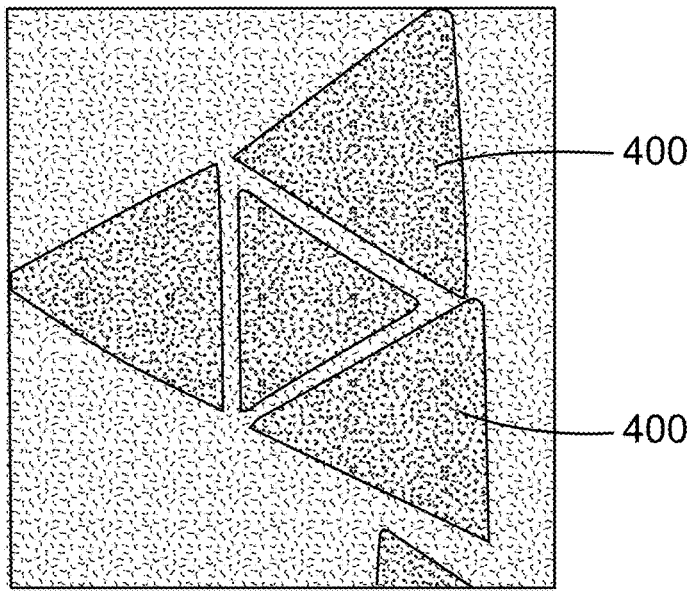
FIG. 11B shows a sketch possible homogenous crystalline structure of a homogenous nanoparticle formed by different precursors nucleating at the same time. $CuInSe_2$ nanoparticles produced using a microwave flow cell reactor in which the Cu and In are nucleated at the same rate, producing homogeneous nanoparticles having well-defined structure.
Figure 12B:
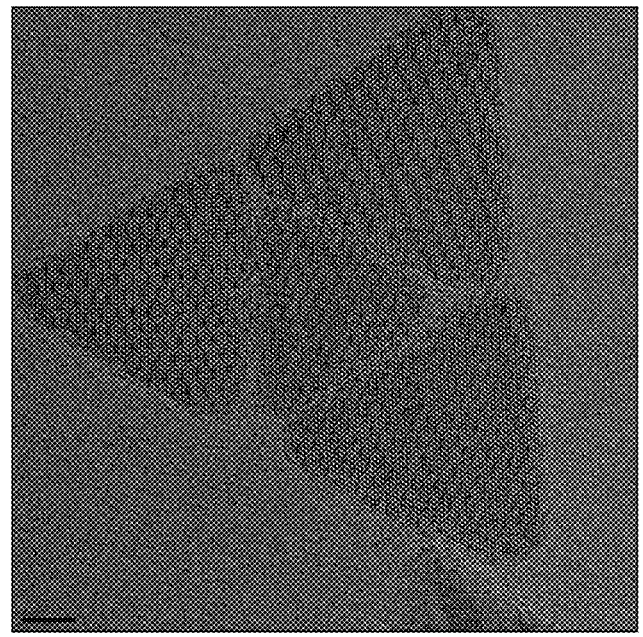
FIG. 12B is an actual image obtained using TEM of the crystalline structure of FIG. 11B.

This example provides an illustrative concept of an embodiment of the invention, namely, the ability to create nanoparticle materials having a high degree of crystallinity, uniform particle size, homogeneous stoichiometry throughout the crystal, batch-to-batch reproducibility as shown in FIG. 11B, and the ability to produce such materials on a large scale as shown in FIG. 2. These properties may be verified through several techniques or the use of multiple techniques, such as:

Size Measurements: determination of the coefficient of variance (COV) through the use of SAX (small angle x-ray scattering), TEM (transmission electron microscopy), and XRD (x-ray diffraction) using standard techniques. The COV is then defined as being:

$$COV=((\text{standard deviation of particle size})/(\text{average of particle size}))*100\%$$

Where a COV <15% within a single run demonstrates uniform particle size, and a COV <15% from batch-to-batch demonstrates reproducibility.

Degree of Crystallinity and Homogeneous Stoichiometry: The degree of crystallinity or the purity of the crystalline phase (as shown in FIG. 11A and FIG. 11B) can be determined by TEM using diffraction scattering patterns and performing a fourier transform analysis to determine the crystalline structure of the material. Another technique that may be used to determine this is XRD, where the resultant diffraction pattern can be matched to a library of known crystal structures and verified as to being inhomogeneous (multiple contributions from different crystals) or homogeneous (one contributing pattern diffraction matching the desired crystal structure). Lack of a diffraction pattern in either XRD and/or TEM is indicative of an amorphous material, indicating poor or non-existent crystal structure.

Homogeneous Stoichiometry and Uniform Particle Size: This information is obtained using either absorbance spectrophotometry or photoluminescent emission. The absorption and photoluminescence characteristics of a nanoparticle are determined by the FWHM (full width half max, where the width of the absorbance or photoluminescence peak is determined at half the height of the peak of interest) obtained through the spectrum. An increase in the FWHM means that one of multiple effects could be taking place, such as: large particle size distribution (COV >15%), insufficient degree of crystallinity resulting in trap states that have different energies than a highly crystalline nanoparticle, and inhomogeneity of the material—giving rise to multiple excitations or emissions from the various regions within the nanoparticle or batch of nanoparticles. A nanoparticle having a high degree of crystallinity, a homogeneous stoichiometry, and being monodisperse will give rise to absorption and/or photoluminescence peaks of: <50 nm FWHM from 400 nm-700 nm, <150 nm FWHM from 700 nm-2000 nm, <300 nm FWHM from 2000 nm-10000 nm.

In the case of metallic nanoparticles, instead of a first exciton excitation and emission, a surface resonance plasmon can be observed. Using the same arguments presented above, a metallic nanoparticle having a high degree of crystallinity will have <50 nm FWHM when excited at the surface plasmon resonance frequency when excited between 400 nm and 700, and <150 nm FWHM when excited in the near-infrared range (700 nm-2000 nm) when exciting at the surface plasmon resonance frequency.

The frequency or frequencies which the microwave operates can also be selected to excite a particular material in the process without exciting other materials such as binders or the like. Microwave frequencies ranging from between 300 MHz (1.24 µeV) to 300 GHz (1.24 meV), which are sufficiently low enough in energy that they do not chemically change the substances by ionization. These energies affect the rotational and bi-rotational energies of molecules when absorbed by such species. These absorbances are unique to each type of bending transition, rotation transition and bi-rotational transition; hence, energies may be selected that interact specifically with each transition. This property allows the ability to select the desired microwave frequency to interact with a specific reactant in a flow cell reactor, which allows several capabilities.

For example, this allows temperature limitations associated with the boiling point of solids to be overcome. By selectively activating only the precursors associated with the synthesis of nanoparticles, the solvent selection can be increased significantly to allow for the solubility of precursors that would not normally be used. Additionally, temperatures of the precursors can effectively be much greater than the solvent, thereby allowing for reactions that are not allowed through traditional heating of the solvent.

The tube 40 carrying the precursors 32, 34 through the energy source 50 can be configured with a cooling system, such as tubes that encircle the tube and carry cooling liquid. This allows the precursors within the tube to be heated, by microwaves or the like, to high enough energy levels to promote nucleation without overheating the tube itself and compromising its structural limits.

Also, nanoparticles may be formed that are not feasible using traditional colloidal nanoparticle synthetic techniques. For example, the energy required for the formation of GaN nanoparticles is great enough to surpass the boiling point of any solvent that is available for synthetic techniques. Accordingly, the formation of these nanoparticles is only done through high energy intensive and expensive deposition systems such as Atomic Layer Deposition ("ALD"). This is done because only the precursors needed for the formation of the GaN nanoparticles are heated in the microwave initiated reaction of the present invention.

Moreover, in cases where one or more reaction pathways are possible, the selective application of microwave frequencies allows for the activation of a desirable reaction pathway. For example, if a given reaction is thermodynamically dominated, the use of selective microwave activating allows for the formation of the kinetic product. The ability to selectively target which species the reaction is going to absorb the microwave energy extends the ability of the continuous flow cell reactor to deliver products that would not normally be delivered at a cost that the microwave continuous flow cell reactor is capable of delivering.

Another example of a possible benefit with selective frequency microwaving involves the use of a polyol process to synthesize nanoparticles of metallic salts. In this process, the metallic (Ni, Co, Ag, and mixtures thereof) salts (acetate, chloride, fluoride, nitrate) are dissolved at 1.0-3.0 mmol ethylene glycol or polypropylene glycol (or similar polyol). At 2.45 GHz, the solvent absorbs the microwave irradiation very strongly, heating the solvent to the point where it then acts as the reducing agent for the metallic precursor, allowing for the formation of metallic nanoparticles. These types of reactions can be shown symbolically as noted below:

$$Ni(O_2CCH_3)_2 + \text{propylene glycol} \rightarrow Ni(0) \text{ nanoparticles}$$

$$AgNO_3 + \text{ethylene glycol} \rightarrow Ag(0) \text{ nanoparticles}$$

Another example is the microwave absorption of precursors for the synthesis of PbS nanoparticles. The synthesis of PbS may be done in the following manner. 1.5 mmol of lead oleate is dissolved in 1-octadecene with the addition of 3.0 mmol-12.0 mmol of oleic acid. 1.4 mmol of bis(trimethylsilyl)sulfide ($TMS_2S$) which was previously dissolved in the 1-octadecene. The microwave frequency of 2.45 GHz is chosen because both the oleic acid and the 1-octadecene have very low absorption cross-sections at this frequency. On the other hand, both the $TMS_2S$ and the lead oleate have a relatively large absorption cross-section at this frequency, allowing the absorption by these materials and the selective activation. This exemplar reaction can be shown symbolically as noted below.

$$Pb(oleate)_2 + TMS_2S \rightarrow PbS(oleate) \text{ nanoparticles}$$

Zone 3—Growth

This is the growth zone. At this point, the nucleates undergo one of two processes: (1) combination with other nucleates to form nanoparticles/quantum dots of the correct core size, or (2) combination with unreacted precursors to form an epitaxial growth system allowing for the formation of the nanoparticles/quantum dots at a very controlled pace. The material is allowed to remain in the growth zone for a period necessary for them to grow to the specific desired core size, after which, the material is moved through Zone 4.

In general, in the growth phase, the nucleates are preferably heated in a heat source 60 over a longer period of time, such as greater than 100 seconds, at a lower energy level than what they faced during nucleation. This allows thermodynamic growth and Ostwald Ripening. This heating may be done using several different systems, including, but not limited to, sand baths, convection ovens, forced air heating, induction ovens, oil baths and column heaters. Preferably, this heat source 60 is spaced apart from the energy source 50 used in nucleation and is custom-tailored to provide optimal growth of the nucleates. The length of the flow path tube 40 extending through the heat source, diameter of the tube, temperature of the heat source, uniform distribution of heat within the tube, and nucleate flow rate though the heat source are selected to optimize growth of the nucleates during this phase (as shown in FIGS. 4A-C and 5A-B) thereby providing uniform morphology and size among the nanoparticles produced.

Figure 4A:
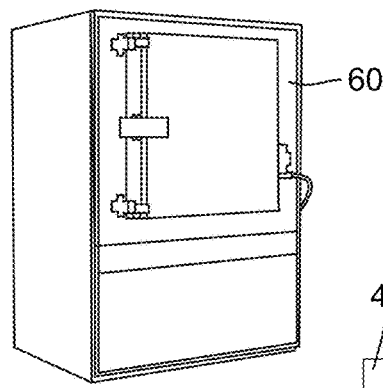
FIG. 4A is a schematic view of zone 3 of the continuous flow reactor of FIG. 1 showing a nanoparticle growth phase using a heating source allowing precise temperature control over multiple lines entering therethrough.
Figure 4B:
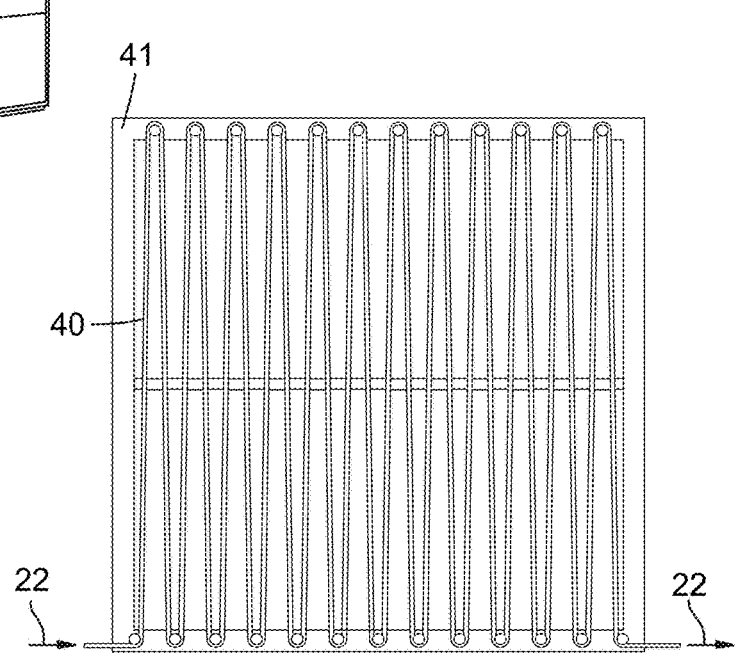
FIG. 4B is a top view of a rack received within the heating source of FIG. 4A allowing for flow lines, with possible variable lengths that can be tailored to this system, for the growth phase of the reaction to take place.
Figure 4C:
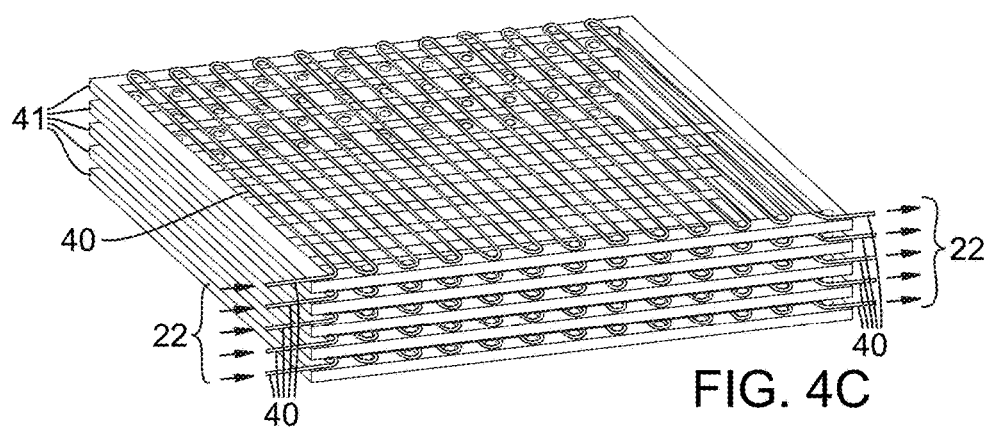
FIG. 4C is an isometric view of multiple racks of FIG. 4B showing a possible stacking arrangement within the heating source of FIG. 4A.
Figure 5A:
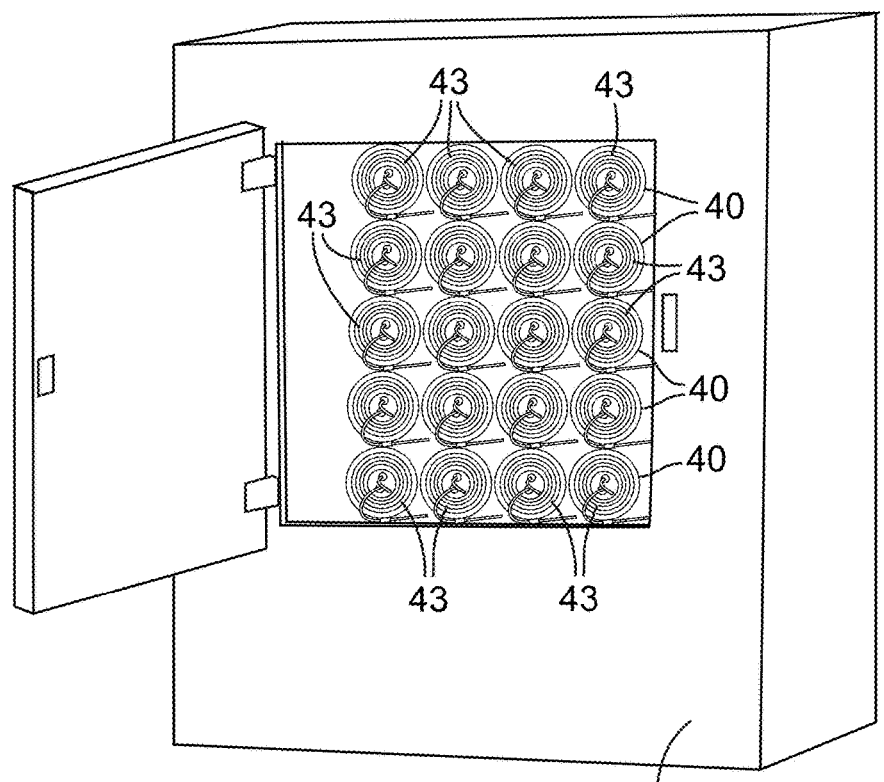
FIG. 5A is a schematic view of an alternative possible heating system for introducing multiple lines into the growth phase heat source of zone 3
Figure 5B:
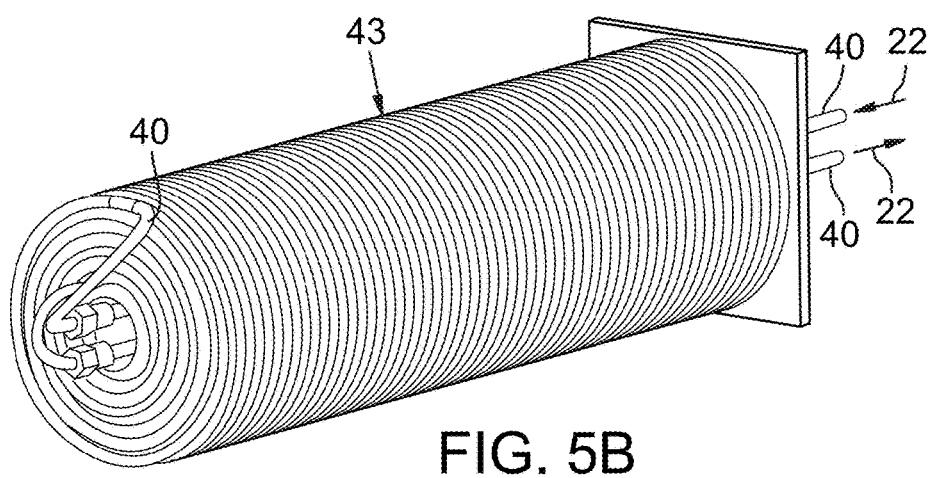
FIG. 5B is an enlarged view of one line of the multiple lines into the growth phase heat source of zone 3 in FIG. 5A.

Referring to FIGS. 4A-4C, the flow tube 40 may be arranged in a serpentine arrangement within a rack 41 that is receivable within the heat source 60. A plurality of racks may be stacked on top of each other as shown in FIG. 4C thereby allowing effective heat distribution to the flow tubes 40 while optimizing space within the heat source 60. An alternative possible arrangement is shown in FIGS. 5A & 5B where individual flow tubes are coiled to define a heat transfer coil 43 with a plurality of heat transfer coils received within the heat source 60

Zone 4—Quenching

The flow path continues past zone 3 to zone 4, where the reaction is immediately terminated through a temperature reduction using a quenching system 86 such as a quenching bath or the like. After quenching the growth of the nanoparticle 70, the segmentation is removed through a degassing step 150 (FIG. 7) to allow for introduction of more material for shell growth and for ease of in-line analysis to be performed.

If needed, increasing the pressure in the flow path 22 can increase the boiling point of a solvent used in the process, thereby allowing the system to operate at higher temperatures and energy levels. One possible way to increase the pressure in the flow path involves inserting a restrictive flow valve into the flow path downstream of the quenching stage. The flow through the valve can be adjusted so as to increase the pressure in the tube upstream of the valve, thereby increasing the pressure in the tube through zones 2 and 3, where the precursor and nucleates are activated and grown.

Figure 7:
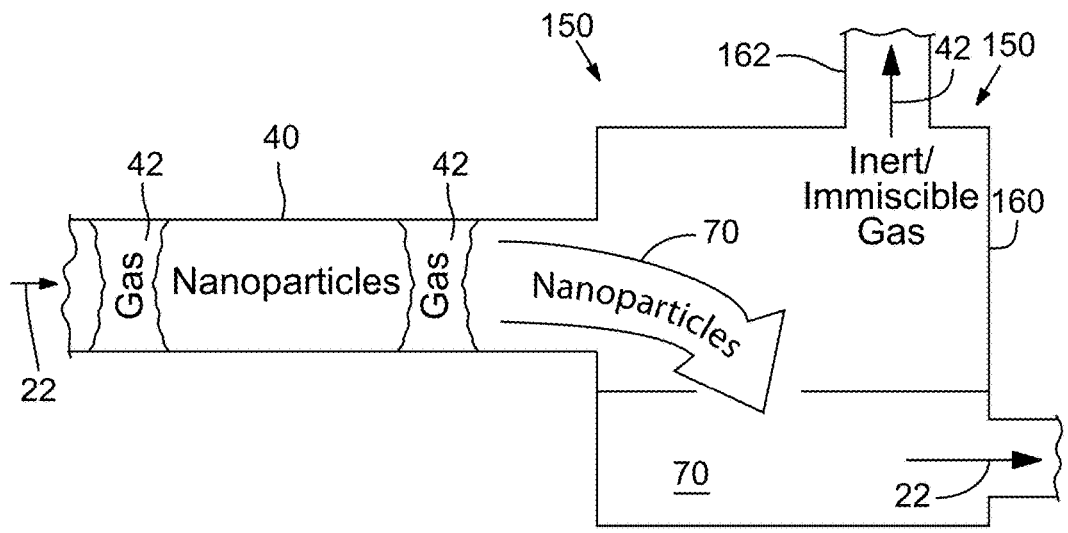
FIG. 7 shows a schematic view of a separator for separating the nanoparticles from the reactively inert gas following the growth phase (Zone 3) and shell formation phase of the fabrication process.

Preferably and as best shown in FIG. 7, the reactively inert gas 42 is also separated from the nanoparticles 70. The flow path 22 extends into a chamber 160 where the nucleates drop downward and exit from below while the gas escapes and is collected from a vent 162 above. Alternatively, the reactively inert gas can be separated at a future point downstream in the flow path as needed.

Real-Time Quality Testing and System Optimization

As shown in FIG. 1, a testing system 72 can be provided following nanoparticle production that tests the quality of the nanoparticles produced. For example, Dynamic Light Scattering ("DLS") can be used to test the properties of the particles produced. Other possible in-line testing systems include spectrophotometry including UV, VIS and IR spectra, fluorometry, and measurement of refractive index.

The testing structure can be in communication with a control system 80 that monitors the results from the testing system 72 and can modulate, preferably in real-time, components in zones 1-4 as needed to optimize the quality of the nanoparticles produced. For example, the flow of the individual precursors, the time and temperature-heating-excitation energy applied through zone 2 and 3 and the amount of reactively inert gas segmented into the flow path in zone 1 can be adjusted by the control system as needed to optimize detected quality of the nanoparticles produced.

Depending on how many shells are introduced onto the surface of the core material (which is produced in Zones 1-4), Zones 1, 3 and 4 can be repeated using a different set of materials (precursors/components) to form core/shell, core/shell/shell and core/shell/shell/shell type structures.

Shell Fabrication System

A post-production shell application system 100 may be provided following the production of the nanoparticles as shown in FIG. 1. As shown in FIG. 2, the shell fabrication system may include structures for supplying one or more additional precursors (here precursors 170, 172, 174, and 176 are shown) and a supplemental heat source 61 for heating downstream therefrom. A continuous flow loop 180 may be provided where any combination of the precursors can be applied to any given shell layer and passed through the heat source 61, thereby allowing multiple shell layers to be formed on each nanoparticle. A second quality testing system 72' may be provided following each shell layer application. With this testing system 72' and the components of the shell fabrication system in operable communication with the control system 80, the control system 80 can provide real-time modulation of the shell fabrication systems as needed to optimize quality of the shell layer on each nanoparticle produced.

The purpose for the shell architecture surrounding the core nanoparticle material is two-fold. First, by matching the lattice parameters closely of the core material, a first shell can be added which increases the quantum yield of the resultant nanoparticle upon exposure to light. This is done by passivating the nanoparticle core surface and eliminating dangling bonds which contribute to non-radiative recombination events. Also, by lattice matching the materials of the nanoparticle core and the first shell, strain effects are reduced, which also causes an increase in the quantum yield of the resultant nanoparticle.

This first shell may also have the added benefit of providing a barrier against environmental degradation effects, such as photo-bleaching and/or oxidation of the core material, which will result in either a blue-shifting of emitted light, or provide multiple trap sites for reduction of effective and desirable electronic properties. However, in the event that this is not provided by the first shell, a second and/or third shell may be provided that will enhance the operational lifetime of nanoparticle materials when used in applications. These second and third shells do not necessarily have to be lattice matched to enhance optical properties unless they interact with the wave function associated with the nanoparticle in the excited state. The primary purpose of the second and third shell are to provide increased operational lifetime by providing protection to the nanoparticle core/shell from environmental effects, which include, but are not limited to: oxidation, photobleaching and temperature extremes.

The first shell integrity can be verified by measuring the quantum yield of the nanoparticle after the first shell has been placed onto the core of the nanoparticle. Poor coverage by the first shell, or poor lattice matching by the first shell will result in low quantum yields (<50%), whereas good coverage by the first shell and good lattice matching between the first shell and the core material will result in large quantum yields (>50%).

The lifetime of the materials can be evaluated by exposure to light, preferably between 250 nm and 700 nm, and measuring the photoluminescent response as a function of time. Increased operational lifetime and enhancement of the stability of these nanoparticles by inclusion of a second and, perhaps, a third shell, will show less than 5% photodegradation of a 10 wt % material in solvent exposed to a minimum of 5 mW light source over the period of two weeks upon continuous exposure in standard atmospheric conditions.

System Redundancy and Redirectable Flow Paths

As shown in FIG. 8, a plurality of reductant elements of the production line, such as two energy sources 50 and two heat sources 60 may be provided with redundant sets of the individual precursors 32, 24 and nanoparticle flow 22 paths interconnectable with valves 300 or the like to allow redirection of the flow path 22 through alternative components should one component before inoperable.

Conservation of Excess Microwave Energy

Figure 10:
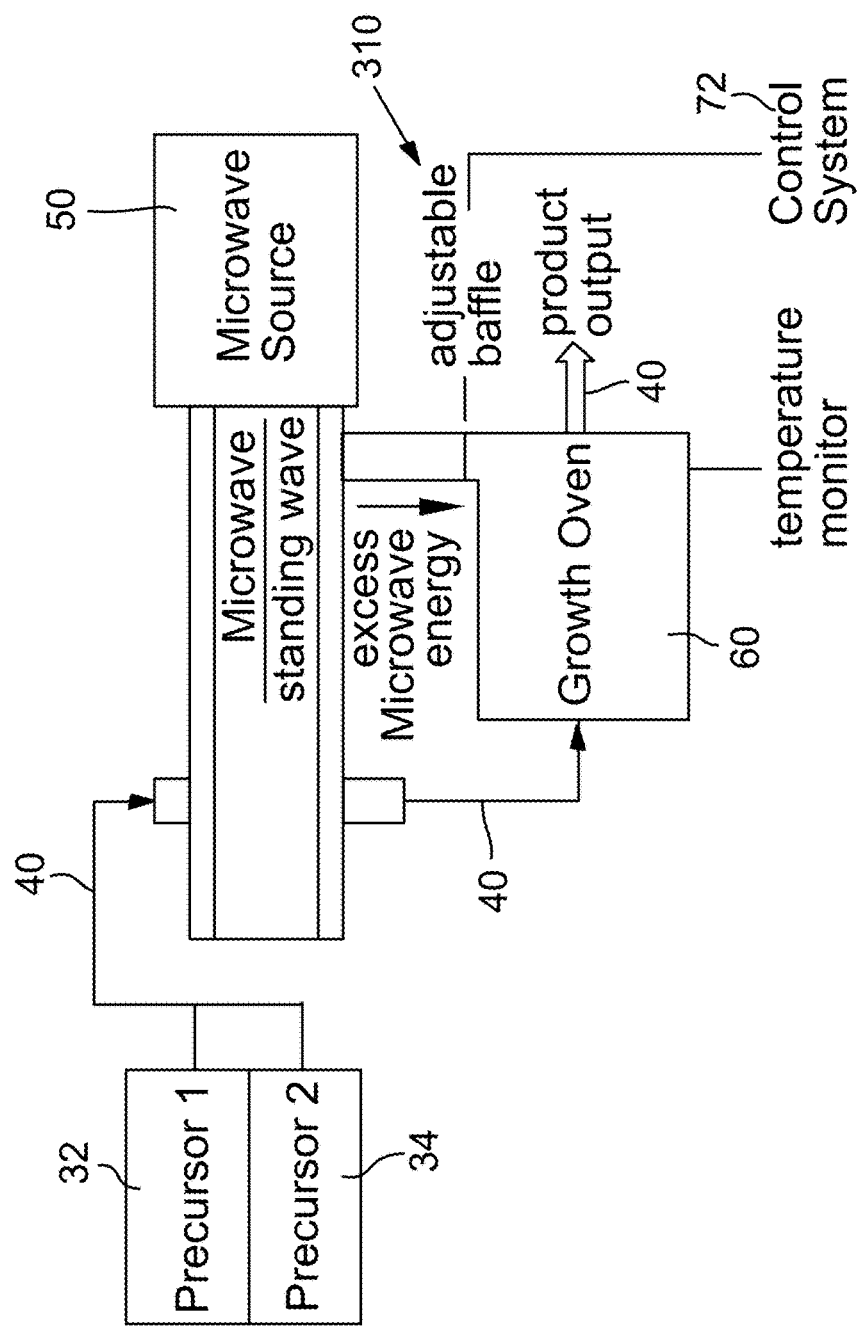
FIG. 10 shows a schematic view of a possible baffle system for redirecting microwave energy to a secondary growth heater thereby improving energy efficiency of the system.

As shown schematically in FIG. 10, in cases where the energy source 50 in zone 2 is a microwave oven, excess microwave energy may be directed to assist with warming the growth area heating source 60 in zone 3. For example, a series of mirrors or the like can be directed to a heat sink such as rubber or the like that collects the excess microwaves and coverts them to heat.

The microwave energy entering the growth chamber can be controlled through an insertable and movable baffle 310 which can attenuate the amount of microwave energy entering the growth area heating source. The temperature of the growth area heating source can be monitored by the control system 72 which modulates the baffle position as needed to maintain a desired temperature in the growth chamber.

Exemplar precursor combinations that have may work particularly well in this flow cell reactor include first precursors selected from those found in "Group A" below with the second precursor is selected from "Group B" or "Group C" below using conventional periodic table nomenclature.

Group A—Precursors
$H_2X$
Where X=O, S, Se, Te
$R_3P=X$
Where R=—H, —$(CH_2)_n$—$CH_3$, —$C_6H_5$, —$C_6H_4$—R'
n=3-18
R'=—$(CH_2)_m$—$CH_3$, —$CH(CH_3)_2$, —$C(CH_3)_3$
m=0-17
X=Se, Te
$R_3N=X$
Where R=—H, —$(CH_2)_n$—$CH_3$, —$Si(CH_3)_3$
n=0-4
X=S, Se, Te
$((CH_3)_3Si)_2X$
Where X=S, Se, Te
$(((CH_3)_3Si)_2N)_2X$
Where X=S, Se, Te
H—X—$(CH_2)_n$—$CH_3$
Where X=O, S, Se, Te
n=1-18, preferably n=4-12, more preferably n=8-10
HO—$CH_2$—$(CH(OH))_n$—$CH_3$
n=1-50, preferably n=1-25, more preferably n=1-5
HO—$CH_2$—$(CH(OH))_n$—$CH_2$—OH
n=1-50, preferably n=1-25, more preferably n=1-5
$H_2NNH_2$
$NaBH_4$
$NaCNBH_3$
and mixtures thereof
including anionic precursors and/or reducing agents Group B—Precursors
M(ligand)$_y$
When y=1, M=Tl, Ag, Cu
When y=2, M=Zn, Cd, Hg, Cu, Pb, Ni
When y=3, M=Al, Ga, B, In, Bi, Fe
Ligand=—($O_2C$—$(CH_2)_n$—$CH_3$), —($O_2C$—$(CH_2)_m$—CH=CH—$(CH_2)_o$—CH3), —S—$(CH_2)_n$—$CH_3$, —$PR_3$, —$OPR_3$
n=2-24, preferably n=8-20, preferably n=12-16
m and o=1-15, preferably n and o=12-16, more preferably n and o=7-9
R=—$(CH_2)_p CH_3$, —$C_6H_5$, —$C_6H_4$—R'
p=0-18
R'=—$(CH_2)_p$—$CH_3$, —$CH(CH_3)_2$, —$C(CH_3)_3$
Or mixtures thereof.

Group C—Precursors
M(ligand)$_y$
When y=1, M=Na, K, Rb, Cs, Ag, Cu
When y=2, M=Mg, Ca, Sr, Ba, Pd, Pt, Cu, Ni
When y=3, M=La, Ce, Pr, Nd, Pm, Sm, Eu, Gd, Tb, Dy, Ho, Er, Tm, Yb, Au
When y=4, M=Ti, Zr, Hf, Pt, Pd
ligand=—$O_2C$—$CH_3$, —Cl, —F, —$NO_3$
or mixtures thereof.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

We claim:

1. A method for producing uniformly sized nanoparticles comprising:
blending at least a first precursor and at least a second precursor together to form a liquid precursor mixture;
conducting the liquid precursor mixture along a continuous flow path;
activating the liquid precursor mixture with one or more of multimodal and multivariable microwave energy from a microwave energy source along the continuous flow path for a first duration at a first energy level thereby allowing uniform nucleation of the mixture of precursors;
heating the liquid precursor mixture with a heating source along the continuous flow path for a second duration at a controlled temperature, thereby promoting uniform thermodynamic growth around previously formed nucleates to form desired core sized nanoparticles; and
quenching the growth of the nanoparticles after heating.

2. The method of claim 1, wherein the microwave energy is multimodal.

3. The method of claim 1, wherein the microwave energy is multivariable in frequency.

4. The method of claim 1, further comprising introducing gas into the continuous flow path fluidically upstream of the microwave energy source, so as to form partitions of the gas in the multiple lines, which separate adjacent segments of the liquid precursor mixture.

5. The method of claim 4, wherein the gas includes one or more of nitrogen and argon.

6. The method of claim 1, wherein the first duration is less than or equal to 60 seconds.

7. The method of claim 1, wherein the first duration is less than or equal to 10 seconds.

8. The method of claim 1, wherein the first duration is less than or equal to 3 seconds.

9. The method of claim 1, wherein the first duration is less than or equal to 2 seconds.

10. The method of claim 1, further comprising monitoring a quality of nanoparticles via one or more sensors; and adjusting the first duration, first energy level, second duration, and temperature, via one or more actuators, in response to the detected quality of the nanoparticles.

11. The method of claim 1, wherein a mixture of two or more precursors from Groups B or C herein, having different microwave absorption cross sections, nucleate with a precursor from Group A herein, at substantially equal rates upon flowing through the microwave energy source, wherein Group A includes $H_2X$ where $X=O, S, Se, Te$; $R_3PX$ where $R=H, (CH_2)_nCH_3, C_6H_5, C_6H_4R'$, $n=3-18$, $R'=(CH_2)_mCH_3, CH(CH_3)_2, C(CH_3)_3$, $m=0-17$, $X=Se, Te$; $R_3NX$ where $R=H, (CH_2)_nCH_3, Si(CH_3)_3$, $n=0-4$, $X=S, Se, Te$; $((CH_3)_3Si)_2X$ where $X=S, Se, Te$; $HX(CH_2)_nCH_3$ where $X=O, S, Se, Te$, $n=1-18$; $HO(CH_2)(CH(OH))_n(CH_3)$ where $n=1-50$; $HO(CH_2)(CH(OH))_n(CH_2OH)$ where $n=1-50$; $H_2NNH_2$; $NaBH_4$, $NaCNBH_3$; and mixtures thereof including anionic precursors and/or reducing agents, wherein Group B includes $ML_y$ where $M=Tl, Ag, Cu$ when $y=1$, $M=Zn, Cd, Hg, Cu, Pb, Ni$ when $y=2$, $M=Al, Ga, B, In, Bi, Fe$ when $y=3$, $L=O_2C(CH_2)_nCH_3$, $O_2C(CH_2)_mCHCH(CH_2)OCH_3)$, $S(CH_2)_nCH_3$, $PR_3$, $OPR_3$, $n=2-24$, $m$ and $o=1-15$, $R=(CH_2)_pCH_3, C_6H_5$, $C_6H_4R'$, $p=0-18$, $R'=(CH_2)_pCH_3, CH(CH_3)_2, C(CH_3)_3$; and mixtures thereof, and wherein Group C includes: $ML_y$ where $M=Na, K, Rb, Cs, Ag, Cu$ when $y=1$, $M=Mg, Ca, Sr, Ba, Pd, Pt, Cu, Ni$ when $y=2$, $M=La, Ce, Pr, Nd, Pm, Sm, Eu, Gd, Tb, Dy, Ho, Er, Tm, Yb, Au$ when $y=3$, $M=Ti, Zr, Hf, Pt, Pd$ when $y=4$, $L=O_2CCH_3, Cl, F, NO_3$; and mixtures thereof.

12. The method of claim 1, wherein nucleation of the first and second precursors over the first duration results in a substantially homogeneous nanoparticle.

13. The method of claim 1, further comprising:
using a continuous-flow process to expose the nanoparticles to a mixture of at least a third precursor from Group A herein and a fourth precursor from Group B or Group C herein; and
heating the exposed nanoparticles in a heat source to form a first shell around the nanoparticle, wherein Group A includes: $H_2X$ where $X=O, S, Se, Te$; $R_3PX$ where $R=H, (CH_2)_nCH_3, C_6H_5, C_6H_4R'$, $n=3-18$, $R'=(CH_2)_mCH_3, CH(CH_3)_2, C(CH_3)_3$, $m=0-17$, $X=Se, Te$; $R_3NX$ where $R=H, (CH_2)_nCH_3, Si(CH_3)_3$, $n=0-4$, $X=S, Se, Te$; $((CH_3)_3Si)_2X$ where $X=S, Se, Te$; $HX(CH_2)_nCH_3$ where $X=O, S, Se, Te$, $n=1-18$; $HO(CH_2)(CH(OH))_n(CH_3)$ where $n=1-50$; $HO(CH_2)(CH(OH))_n(CH_2OH)$ where $n=1-50$; $H_2NNH_2$; $NaBH_4$, $NaCNBH_3$; and mixtures thereof including anionic precursors and/or reducing agents, wherein Group B includes: $ML_y$ where $M=Tl, Ag, Cu$ when $y=1$, $M=Zn, Cd, Hg, Cu, Pb, Ni$ when $y=2$, $M=Al, Ga, B, In, Bi, Fe$ when $y=3$, $L=O_2C(CH)_nCH_3$, $O_2C(CH_2)_mCHCH(CH_2)OCH_3)$, $S(CH_2)_nCH_3$, $PR_3$, $OPR_3$, $n=2-24$, $m$ and $o=1-15$, $R=(CH_2)_nCH_3, C_6H_5$, $C_6H_4R'$, $p=0-18$, $R'=(CH_2)_pCH_3, CH(CH_3)_2, C(CH_3)_3$; and mixtures thereof, and wherein Group C includes: $ML_y$ where $M=Na, K, Rb, Cs, Ag, Cu$ when $y=1$, $M=Mg, Ca, Sr, Ba, Pd, Pt, Cu, Ni$ when $y=2$, $M=La, Ce, Pr, Nd, Pm, Sm, Eu, Gd, Tb, Dy, Ho, Er, Tm, Yb, Au$ when $y=3$, $M=Ti, Zr, Hf, Pt, Pd$ when $y=4$, $L=O_2CCH_3, Cl, F, NO_3$; and mixtures thereof.

14. The method of claim 13, further comprising:
using a continuous-flow process to expose the nanoparticles to a mixture of a fifth precursor and a sixth precursor; and
heating the exposed nanoparticle to form a second shell around the first shell.

15. The method of claim 13, further comprising: using a continuous-flow process to expose the nanoparticles to a mixture of a fifth precursor to from Group A herein and a sixth precursor from Group B or Group C herein; and
heating the exposed nanoparticle to form a second shell around the first shell, wherein Group A includes: $H_2X$ where $X=O, S, Se, Te$; $R_3PX$ where $R=H, (CH_2)_nCH_3, C_6H_5, C_6H_4R'$, $n=3-18$, $R'=(CH_2)_mCH_3, CH(CH_3)_2, C(CH_3)_3$, $m=0-17$, $X=Se, Te$; $R_3NX$ where $R=H, (CH_2)_nCH_3, Si(CH_3)_3$, $n=0-4$, $X=S, Se, Te$; $((CH_3)_3Si)_2X$ where $X=S, Se, Te$; $HX(CH_2)_nCH_3$ where $X=O, S, Se, Te$, $n=1-18$; $HO(CH_2)(CH(OH))_n(CH_3)$ where $n=1-50$; $HO(CH_2)(CH(OH))_n(CH_2OH)$ where $n=1-50$; $H_2NNH_2$; $NaBH_4$, $NaCNBH_3$; and mixtures thereof including anionic precursors and/or reducing agents, wherein Group B includes: $ML_y$ where $M=Tl, Ag, Cu$ when $y=1$, $M=Zn, Cd, Hg, Cu, Pb, Ni$ when $y=2$, $M=Al, Ga, B, In, Bi, Fe$ when $y=3$, $L=O_2C(CH_2)_nCH_3$, $O_2C(CH_2)_mCHCH(CH_2)OCH_3)$, $S(CH_2)CH_3$, $PR_3$, $OPR_3$, $n=2-24$, $m$ and $o=1-15$, $R=(CH_2)_pCH_3, C_6H_5$, $C_6H_4R'$, $p=0-18$, $R'=(CH_2)_pCH_3, CH(CH_3)_2, C(CH_3)_3$; and mixtures thereof, and wherein Group C includes: $ML_y$ where $M=Na, K, Rb, Cs, Ag, Cu$ when $y=1$, $M=Mg, Ca, Sr, Ba, Pd, Pt, Cu, Ni$ when $y=2$, $M=La, Ce, Pr, Nd, Pm, Sm, Eu, Gd, Tb, Dy, Ho, Er, Tm, Yb, Au$ when $y=3$, $M=Ti, Zr, Hf, Pt, Pd$ when $y=4$, $L=O_2CCH_3, Cl, F, NO_3$; and mixtures thereof.

16. The method of claim 15, further comprising:
using a continuous-flow process to expose the nanoparticles to a mixture of a seventh precursor from Group A herein and a eighth precursor from Group B or Group C herein; and
heating the exposed nanoparticle to form a third shell around the second shell.

17. The method of claim 4, further including the step of separating the gas from the nanoparticles following the step of quenching the growth of the nanoparticle.

18. The method of claim 1, wherein the continuous flow path comprises multiple lines, and wherein one or more of the multiple lines comprises an inner diameter between 1/16 of an inch and 1 inch.

19. The method of claim 18, wherein one or more of the multiple lines has an inner diameter between 1/4 and 1/2 inch.

20. The nanoparticle of claim 1, wherein the microwave energy operates at frequencies that cause the first and second precursors to nucleate at substantially the same time thereby producing substantially homogenous nanoparticles.

21. A method for producing uniformly sized nanoparticles comprising:
blending together a first and second precursor to form a liquid precursor mixture;
conducting the liquid precursor mixture along multiple lines of a continuous flow path;
introducing gas into the continuous flow path fluidically upstream of the microwave energy source, so as to form partitions of the gas in the multiple lines, which separate adjacent segments of the liquid precursor mixture;
activating the liquid precursor mixture with multimodal and/or multivariable microwave energy from a microwave energy source in the continuous flow path, the microwave energy source configured to uniformly irradiate the multiple lines and thereby uniformly nucleate the liquid precursor mixture, for a first duration at a first energy level;
heating the activated liquid precursor mixture with a heating source in the continuous flow path for a second duration at a controlled temperature, thereby promoting uniform thermodynamic growth around previously formed nucleates to form desired core sized nanoparticles; and quenching the growth of the nanoparticles after heating.

22. The method of claim 21, wherein first duration is less than or equal to 10 seconds.

23. The method of claim 21, wherein the first duration is less than or equal to 3 seconds.

24. The method of claim 21, wherein the first duration is less than or equal to 2 seconds.

25. The method of claim 21, wherein the microwave energy is multimodal.

26. The method of claim 21, the microwave energy is of multivariable frequency.

27. The method of claim 21, wherein the gas includes one or more of nitrogen and argon.

28. The method of claim 21, further comprising monitoring a quality of nanoparticles via one or more sensors; and adjusting the first duration, first energy level, second duration, and temperature, via one or more actuators, in response to the detected quality of the nanoparticles.

29. The method of claim 21, wherein a mixture of two or more precursors from Groups B or C herein, having different microwave absorption cross sections, nucleate with a precursor from Group A herein, at substantially equal rates upon flowing through the first energy source, wherein Group A includes: $H_2X$ where X=O, S, Se, Te; $R_3PX$ where R=H, $(CH_2)_nCH_3$, $C_6H_5$, $C_6H_4R'$, n=3-18, R'=$(CH_2)_mCH_3$, $CH(CH_3)_2$, $C(CH_3)_3$, m=0-17, X=Se, Te; $R_3NX$ where R=H, $(CH_2)_nCH_3$, $Si(CH_3)_3$, n=0-4, X=S, Se, Te; $((CH_3)_3Si)_2X$ where X=S, Se, Te; $HX(CH_2)_nCH_3$ where X=O, S, Se, Te, n=1-18; $HO(CH_2)(CH(OH))_n(CH_3)$ where n=1-50; $HO(CH_2)(CH(OH))_n(CH_2OH)$ where n=1-50; $H_2NNH_2$; $NaBH_4$, $NaCNBH_3$; and mixtures thereof including anionic precursors and/or reducing agents, wherein Group B includes: $ML_y$ where M=Tl, Ag, Cu when y=1, M=Zn, Cd, Hg, Cu, Pb, Ni when y=2, M=Al, Ga, B, In, Bi, Fe when y=3, L=$O_2C(CH_2)_nCH_3$, $O_2C(CH_2)_mCHCH(CH_2)OCH_3)OCH_3)$, $S(CH_2)_nCH_3$, $PR_3$, $OPR_3$, n=2-24, m and o=1-15, R=$(CH_2)_pCH_3$, $C_6H_5$, $C_6H_4R'$, p=0-18, R'=$(CH_2)_pCH_3$, $CH(CH_3)_2$, $C(CH_3)_3$; and mixtures thereof, and wherein Group C includes: $ML_y$ where M=Na, K, Rb, Cs, Ag, Cu when y=1, M=Mg, Ca, Sr, Ba, Pd, Pt, Cu, Ni when y=2, M=La, Ce, Pr, Nd, Pm, Sm, Eu, Gd, Tb, Dy, Ho, Er, Tm, Yb, Au when y=3, M=Ti, Zr, Hf, Pt, Pd when y=4, L=$O_2CCH_3$, Cl, F, $NO_3$; and mixtures thereof.

30. The method of claim 29, wherein the nucleation of the first and second precursors over the first duration results in substantially homogeneous nanoparticles.

31. The method of claim 1 wherein the first and second precursors are blended prior to conduction along the continuous flow path.

32. The method of claim 1 wherein the first and second precursors are blended during conduction along the continuous flow path.

33. The method of claim 4, wherein the continuous flow path comprises at least one line having an inner diameter between 1/16 of an inch and 1 inch.

34. The method of claim 33, wherein the at least one line has an inner diameter between 1/4 and 1/2 inch.

* * * * *